(12) United States Patent
Vance et al.

(10) Patent No.: US 10,898,816 B2
(45) Date of Patent: Jan. 26, 2021

(54) RIDE RESTRAINT SYSTEM AND METHOD

(71) Applicant: Universal City Studios LLC, Universal City, CA (US)

(72) Inventors: Eric Vance, Orlando, FL (US); Lara Larberg MacLean, Orlando, FL (US); Dale Mason, Orlando, FL (US); Marcel Santos, Orlando, FL (US); Powers Alexander Yamich, Orlando, FL (US)

(73) Assignee: Universal Studios LLC, Universal City, CA (US)

( * ) Notice: Subject to any disclaimer, the term of this patent is extended or adjusted under 35 U.S.C. 154(b) by 0 days.

(21) Appl. No.: 16/373,585

(22) Filed: Apr. 2, 2019

(65) Prior Publication Data

US 2019/0308111 A1    Oct. 10, 2019

Related U.S. Application Data

(60) Provisional application No. 62/652,839, filed on Apr. 4, 2018.

(51) Int. Cl.
*A63G 1/00* (2006.01)
*B60R 21/02* (2006.01)
*B60R 21/00* (2006.01)

(52) U.S. Cl.
CPC ............... *A63G 1/00* (2013.01); *B60R 21/02* (2013.01); *B60R 2021/0097* (2013.01); *B60R 2021/022* (2013.01); *B60R 2021/028* (2013.01)

(58) Field of Classification Search
CPC ........... B60R 21/00; B60R 21/02; B60N 2/00; B60N 2/42754; A63G 31/00

USPC ................... 472/43, 59–61, 130; 297/216.1; 280/730.1
See application file for complete search history.

(56) References Cited

U.S. PATENT DOCUMENTS

| | | | |
|---|---|---|---|
| 6,405,655 B1 | 6/2002 | Clerx et al. | |
| D583,435 S | 12/2008 | Zamperla et al. | |
| D616,055 S | 5/2010 | Zamperla et al. | |
| 8,308,232 B2 | 11/2012 | Zamperla et al. | |
| 8,453,576 B2 | 6/2013 | Roodenburg et al. | |
| 2002/0070599 A1* | 6/2002 | Berra | A63G 7/00 297/466 |
| 2005/0001466 A1 | 1/2005 | Zambelli et al. | |
| 2008/0081706 A1 | 4/2008 | Zamperla et al. | |
| 2010/0236444 A1 | 9/2010 | Blonk et al. | |
| 2014/0232151 A1* | 8/2014 | Wilmot | B60N 2/4279 297/216.1 |
| 2016/0114749 A1 | 4/2016 | Howard | |

OTHER PUBLICATIONS

PCT/US2019/025653 Search Report and Written Opinion dated Jun. 4, 2019.

* cited by examiner

*Primary Examiner* — Kien T Nguyen
(74) *Attorney, Agent, or Firm* — Fletcher Yoder P.C.

(57) ABSTRACT

A ride vehicle for an amusement park includes a restraint system. The restraint system includes a first conformable component configured to be disposed over a first lower portion of a guest's body. The restraint system further includes a behind-the-knee component configured to be disposed behind a leg of the guest. The restraint system additionally includes a linkage mechanism configured to move the first conformable component, the behind-the-knee component, or a combination thereof, to secure the restraint system to the guest.

19 Claims, 7 Drawing Sheets

RIDE RESTRAINT SYSTEM AND METHOD

CROSS REFERENCE TO RELATED APPLICATIONS

This application claims benefit of U.S. Provisional Application Ser. No. 62/652,839, filed Apr. 4, 2018, entitled "RIDE RESTRAINT SYSTEM AND METHOD" which is hereby incorporated by reference in its entirety for all purposes.

BACKGROUND

The present disclosure relates generally to the field of amusement park rides. More specifically, embodiments of the present disclosure relate to ride restraint systems and methods for amusement park rides.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Amusement parks include a variety of features providing unique experiences to each park guest. Some features may include a ride vehicle that may travel along a specific path. The path may include elements such that as the ride vehicle travels along the path, those elements may enhance a guest's experience. A restraint system may be used to restrain the park guest to the ride vehicle during the park ride. It may be beneficial to improve restraint systems.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a ride vehicle for an amusement park includes a restraint system. The restraint system includes a first conformable component configured to be disposed over a first lower portion of a guest's body. The restraint system further includes a behind-the-knee component configured to be disposed behind a leg of the guest. The restraint system additionally includes a linkage mechanism configured to move the first conformable component, the behind-the-knee component, or a combination thereof, to secure the restraint system to the guest.

In another embodiment, a method includes actuating a first conformable component included in a restraint system of a ride vehicle for an amusement park, wherein the first conformable component is configured to be disposed over a first lower portion of a guest's body. The method further includes actuating a behind-the-knee component included in the restraint system, wherein the behind-the-knee component is configured to be disposed behind a leg of the guest. The method additionally includes sensing if the first conformable component, the behind-the-knee component, or a combination thereof, is secured to the guest.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
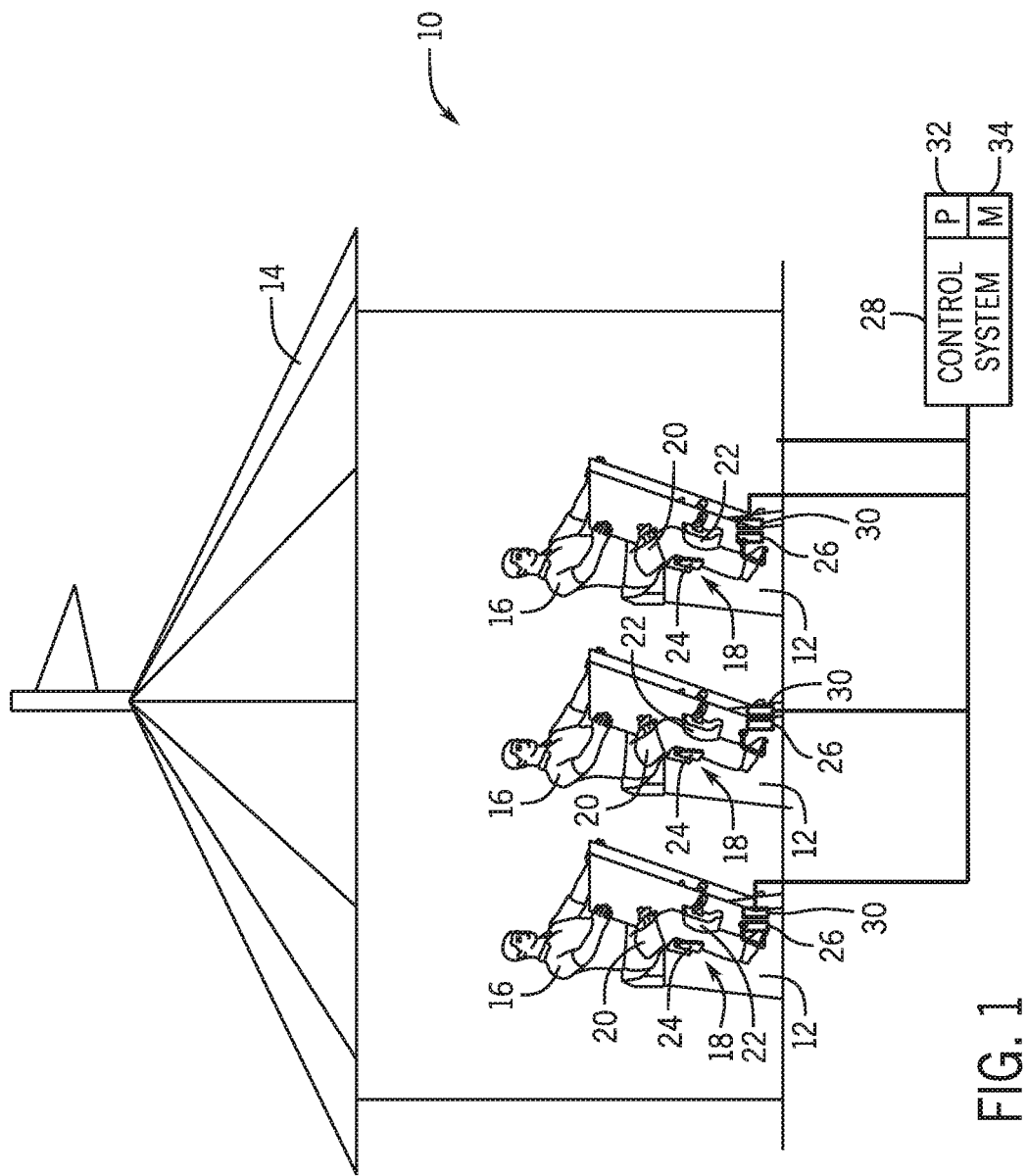
FIG. 1 is a block diagram view of an embodiment of a ride system having one or more ride vehicles that may be located in an amusement park, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain ride vehicles may provide park guests with an upright astride ride position, for example, when a ride vehicle is representative of a horse. Embodiments of the present disclosure are directed to ride restraint systems that restrain a park guest via a lower portion of the guest's body while allowing for freedom of movement of the upper body and arms. The restraint systems may include conformable components shaped to enclose a thigh, knee, and/or shin portion on one or both legs of the park guest, and a behind-the-knee component that may be used in combination with the conformable component(s) to provide for a restraint that secures the lower body to the ride vehicle. The restraint systems may be suitable for use with a variety of park guests of different ages and sizes, including adults and children.

In certain embodiments, the park guest may sit astride the ride vehicle and then manually engage the restraint system to position the conformable component(s) over the thigh, knee, and/or shin area, as well as a behind-the-knee area. A linkage mechanism may engage the conformable component(s) and the behind-the-knee component to move together as a group following certain biometric techniques, as further described below. As the restraint system closes over the aforementioned lower body portions, one or more pressure sensors may detect a pressure exerted by certain restrain system components and lock the restrain system in place when a desired pressure is achieved. Once the desired pressure is achieved in the restraint system, a controller may then dispatch the ride vehicle(s) with the passengers now restrained via the techniques described herein. By providing for restraint systems that may include movable conformable shape(s) and a behind-the-knee component disposed via the linkage mechanism, the techniques described herein may provide park guests with a restraint system that enhances the park ride by enabling upper body and arm mobility while supporting and restraining the park guests during the ride. The restraint systems describe herein not only restrain the park guest but also provide for guest containment to ensure there is no unintended self-extraction from the ride before or after dispatch from a load/unload station.

Turning to the drawings, FIG. 1 is a block diagram of an embodiment of a ride system 10 that may be located in an amusement park. As illustrated in FIG. 1, the ride system 10 may include one or more ride vehicles 12, for example, representatives of horses disposed within an enclosure 14, such as a carousel ride. Park guests 16 may enter the ride 14 and subsequently mount astride the ride vehicles 12. Each ride vehicle 12 may include a ride restraint system 18 which may have one or more conformable components (e.g., first conformable component 20 and second conformable component 22) restraining a lower body portion of each park guest 16. While in the depicted embodiment two conformable components 20, 22 are shown restraining each leg of the park guest 16, it is to be noted that in other embodiments, the restraint system 18 may include a single conformable component or more than two conformable components restraining each leg of the park guest 16. The illustrated embodiment of the restraint system 18 also shows a behind-the-knee component 24 which may be used to provide a restraint behind each leg of the park guest 16.

In use, the park guest 16 may sit on the ride vehicle 12 and then manually begin to close the restraint system 18, as further described below. The components 20, 22, 24 may move towards and then contact the lower body of the park guest 16. As the components 20, 22, 24 contact the park guest's lower body (e.g., legs), one or more sensors 26, such as pressure sensors disposed on one or more of the components 20, 22, 24. The control system 28 may be communicatively coupled to the sensors 26 to senses certain information, such as pressures between portions of the body and the components 20, 22, 24. The control system 28 may then actuate one or more actuators 30 to lock the components 20, 22, 24 once a desired pressure (or pressure range) is reached. The actuators 30 may include hydraulic actuators, pneumatic actuators, linear actuators, positioners, and so on. At the desired pressure or pressure range, the components 20, 22, 24 may suitably secure the park guest 16 in place. Once all park guests 16 are secured, e.g. once the sensors 26 provide indications of a desired pressure to the control system 28, the control system 28 may then dispatch the ride vehicles 12 to begin the park ride. As the ride vehicles 12 move, e.g., via the carousel 14, the restraint system 18 may enable free movement of guests' arms and more generally, the upper body. It is to be understood that in some embodiments the sensors 28 may not be used.

The control system 28 may be located within the enclosure 14, or may be located outside of the enclosure 14. The control system 28 may include a memory 34 with stored instructions for controlling either or both the ride vehicle 12 and the restraint system 18. In addition, the control system 28 may include a processor 32 configured to execute such instructions. For example, the processor 32 may include one or more application specific integrated circuits (ASICs), one or more field programmable gate arrays (FPGAs), one or more general purpose processors, or any combination thereof. Additionally, the memory 34 may include volatile memory, such as random access memory (RAM), and/or non-volatile memory, such as read-only memory (ROM), optical drives, hard disc drives, or solid-state drives. Actuators 30 may also include actuators used to move the vehicle 12 during the park ride, such as electric motors, hydraulic systems, pneumatic system, and the like.

Figure 2:
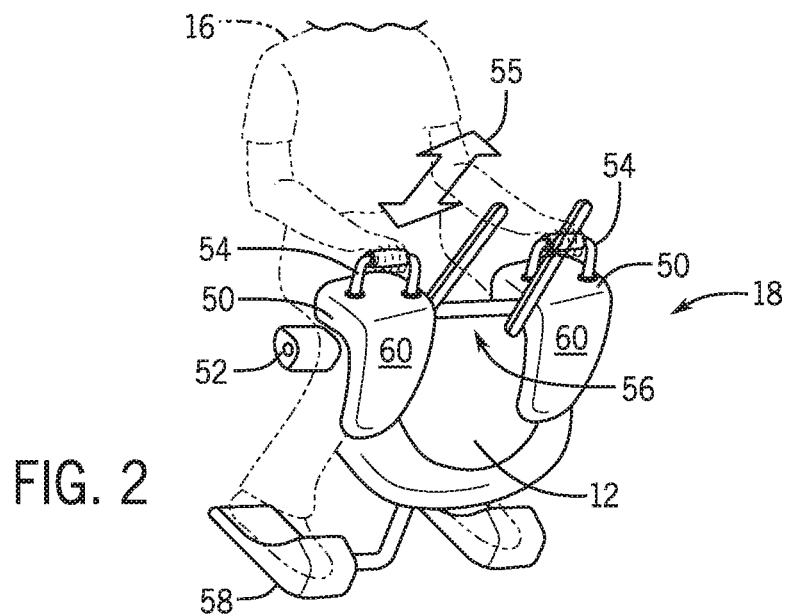
FIG. 2 is a perspective view of an embodiment of a restraint system included in the ride system of FIG. 1, in accordance with an aspect of the present disclosure.

FIG. 2 is a perspective view of an embodiment of the restraint system 18 having one conformable component 50 per leg, each conformable component disposed on an upper portion of the park guest's leg when the park guest is seated on the ride vehicle 12. More specifically, each conformable component 50 is shown as disposed over a thigh section, the knee, and an upper shin section of a leg of the park guest. Also shown is a behind-the-knee component 52. As mentioned earlier, the park guest 16 may enter the enclosure 14, sit astride the ride vehicle 12, and then manually deploy the restraint system 18 to secure themselves into the ride vehicle 12 via their lower body. More specifically, once seated, the park guest may use handles 54 to pull inwardly towards the body along an axis 55. It is also to be noted that the closing of the restraint system 18 may be performed via the control system 28, or via a combination of the park guest 16 and the control system 28 (e.g., when a handle 54 pull is used to activate the control system 28 to then automatically close the restraint system 18). As the conformable components 50 move downwards towards the legs, a linkage mechanism 56 also moves the behind-the-knee component 52 upwards towards the knee.

The linkage mechanism 56 may include biometric techniques suitable for moving the conformable components (e.g., 20, 22, 50) in conjunction with the behind-the-knee component (e.g., 24, 52) so that the components press against their respective body part regardless of the park guest's size. For example, an adult guest typically has a longer anatomical length between a top surface of the knee and a behind-the-knee surface distance when compared to a child guest. The linkage mechanism enables a desired placement of the conformable component(s) with respect to the behind-the-knee component (e.g., 24, 52) regardless of size. That is, as shown, when the conformable component 50 touches the adult guest's knees, the behind-the-knee component 52 is likely at a location suitable for touching the adult guest's behind the knee area. Likewise, as the conformable component 50 touches the child guest's knees, the behind-the-knee component 52 is likely at a location suitable for touching the child guest's behind the knee area.

As pressure is applied to respective lower body areas by the conformable components and/or by the behind-the-knee component, one or more pressure sensors 26 may provide the control system 28 with pressure readings to determine when a desired pressure or pressure range has been reached. The control system 28 may then lock the restraint system 18 to prevent further movement of the conformable components and the behind-the-knee component. The control system may also control the automatic closing of the restraint system by closing the conformable components and/or the behind-the-knee component. Accordingly, the restraint system 18 may be classified as an American Society for Testing and Materials (ASTM) class 3 or class 4 restraint.

In the depicted embodiment, the conformable component 50 includes a shape suitable for enveloping the park guest's knee, portion of the thigh, and portion of the shin. The conformable component 50 may be molded, extruded, 3D printed, and so on, from a variety of materials such as acrylonitrile butadiene styrene (ABS), phthalate-free polyvinyl chloride (PVC), polyethylene terephthalate (PET), low-density polyethylene (LDPE), polypropylene, silicone, polyamide, plastics of various types, metals, and the like. The figure also illustrates a pair of foot paddles 58 that may be used as foot rests. In one embodiment, the foot paddles 58 may be adjustable independent of the restraint system 18 components, e.g., the conformable components 20, 22, 50 and the behind-the-knee component 24, 52. In other embodiments, the foot paddles 58 may move in conjunction with other restraint system 18 components, e.g., the conformable components 20, 22, 50 and the behind-the-knee component 24, 52. In yet other embodiments, the foot paddles may 58 not be used. Stairs may also be used in some embodiments, to aid in mounting onto the ride vehicle 12.

The conformable components may also include removable and replaceable outer shells 60. For example, the ride may be customized via different colored shells, shells having different finishes (e.g., armored shells, shells with different textures, and so on). The conformable components 20, 22, 50, the behind-the-knee component 24, 52, and/or the foot paddles 58 may include foam padding, as shown in FIG. 3.

Figure 3:
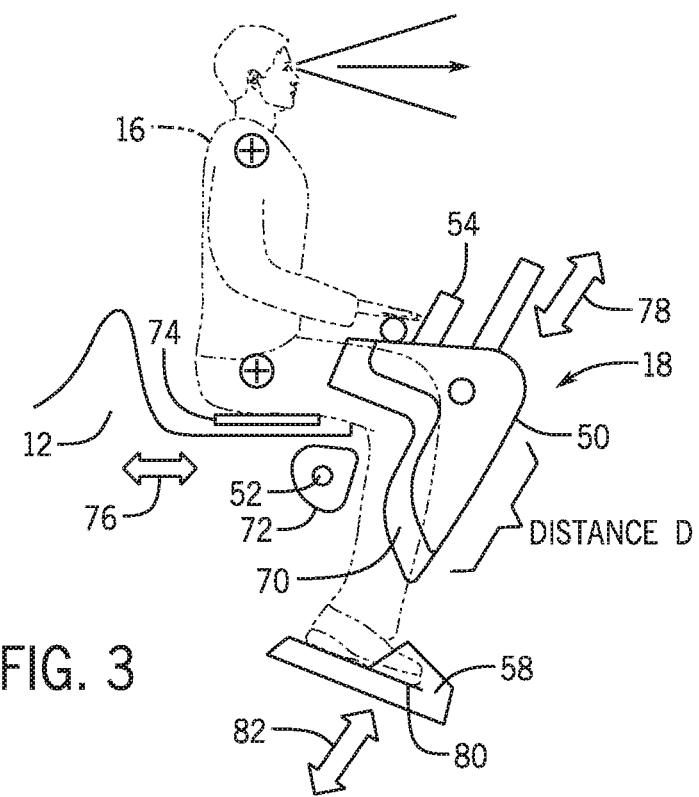
FIG. 3 is a side view of an embodiment of the restraint system of FIG. 2, in accordance with an aspect of the present disclosure.

More specifically, FIG. 3 is a side view illustrating an embodiment of the restraint system with the conformable component 50 shown as having a foam padding 70 to cushion contact between an interior of the conformable component 50 and the park guest's thigh region, knee, and lower shin region. Likewise, the behind-the-knee component 52 is shown as having an outer foam padding 72 suitable to cushion contact with behind-the-knee areas of the park guest 16. In use the foam padding 70, 72 may provide for enhanced comfort during the park ride. Enhanced comfort may also be provided via an adjustable seat 74. The adjustable seat 74 may move in a horizontal plane to more comfortably fit the park guest 16 to the ride vehicle 12. In use, the park guest 16 may mount onto the ride vehicle 12 and then adjust a seating position by moving the adjustable seat 74 along an axis 76. Once the adjustable seat 74 is in a desired position, the park guest 16 may lock the adjustable seat 74 and then adjust the restraint system 18 via the conformable components 50 and the behind-the-knee component 52. As mentioned earlier, the park guest 16 may grasp the handles 54 and move the handles 54 along an axis 78 to engage or otherwise close the restraint system 18. The conformable components 50 and the behind-the-knee component 52 may then move in conjunction with each other to secure the park guest 16 in place.

As the conformable component 50 moves with respect to the behind-the-knee component 52, a distance between the conformable component 50 and the behind-the-knee component 52 may change until a distance D is achieved. The distance D may be achieved, in one embodiment, when the conformable component 50, the behind-the-knee component 52, or a combination thereof, provide for a desired pressure as measured by sensors 26 disposed in the conformable component 50, in the behind-the-knee component 52, or in a combination thereof. The distance D may also be representative of a biometric measurement of a distance between a front of the human knee and a back of the human knee for various anatomies. That is, a child's distance D is smaller than an adult's distance D. However, the linkage mechanism 56 may move the behind-the-knee component 52 a certain amount or ratio with respect to the conformable component 50 (e.g., ratios 1:1, 1:1.5, 1:2, etc.) so that when the conformable component 50 touches the seated guest 16 at the front of the knee the behind-the-knee component 52 is close to or also touching the seated guest 16 behind the knee. The ratio may be arrived by an analysis of different sizes of human anatomies in the knee region, for example.

The figure also illustrates the foot paddles 58, which may also include foam padding 80 (e.g., internal foam padding). The foot paddles 58 may move independent of the restraint system 18, or may be part of the restraint system 18 and move in conjunction with other components (e.g., conformable component 50, behind-the-knee component 52) to support the park guest's feet. In the depicted embodiment, the foot paddles 58 are shown as movable through an axis 82. Once the foot paddles 58 are in a desired position, the park guest 16 and/or the control system 28 may also lock them in place, for example, via actuators 30.

Figure 4:
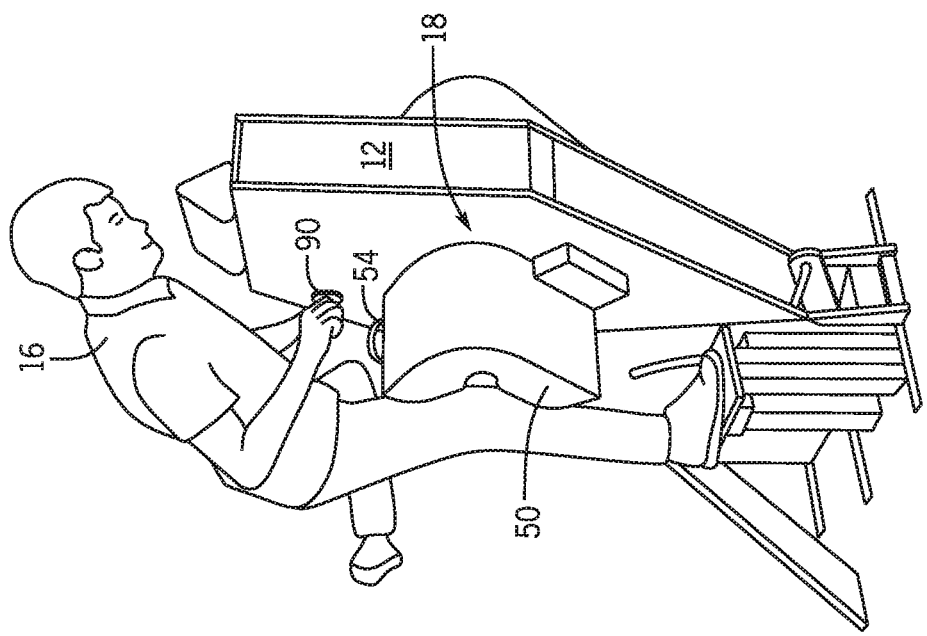
FIG. 4 is a right perspective view of an embodiment of the ride vehicle of FIG. 1 showing a park guest mid-stride as the park guest is mounting the ride vehicle, in accordance with an aspect of the present disclosure.

It may be beneficial to illustrate a sequence where the park guest 16 may mount the ride vehicle 12 and then lock the restraint system 18 in place. Accordingly, FIGS. 4-7 show various positions in sequential order where the park guest 16 mounts the ride vehicle 12 and then closes the restraint system 18. Turning now to FIG. 4, the figure is a right perspective view illustrating an embodiment of the ride vehicle 12 showing the park guest 16 mid-stride as the park guest 16 is mounting the ride vehicle 12 having the restraint system 18. It is to be noted that while the view shows the park guest 16 mounting on a right side of the ride vehicle 12, the park guest 16 may alternatively mount the ride vehicle 12 via a left side. In the depicted embodiment, the conformable component 50 and the behind-the-knee component 52 (not shown) are deployed in a fully "open" position, thus enabling an easier entry into the ride vehicle. The figure also shows the park guest 16 using his right hand to hold an upper handle 90 for additional support during entry into the ride vehicle 12.

Figure 5:
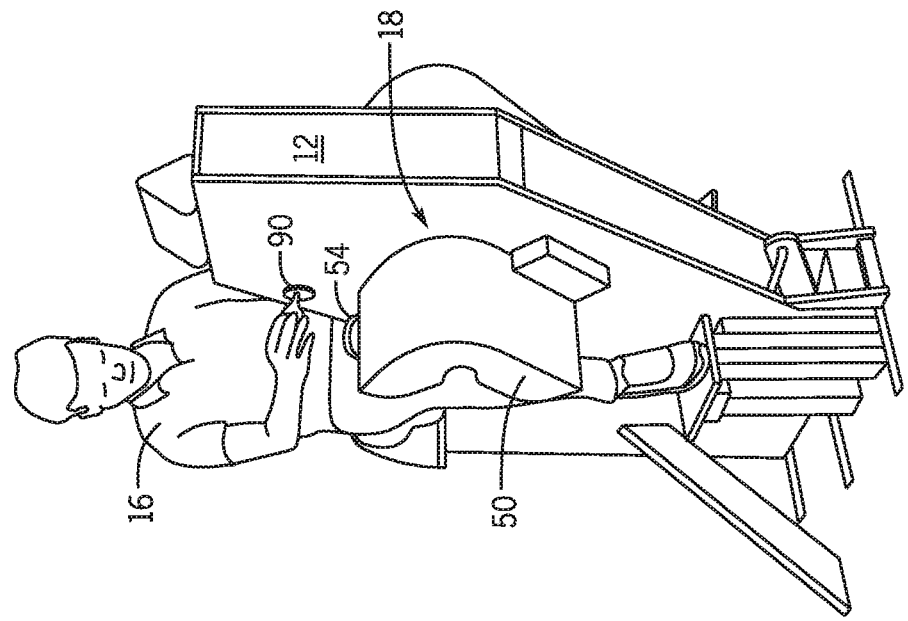
FIG. 5 is a right perspective view illustrating an embodiment of the ride vehicle of FIG. 1 with the park guest now fully seated in the ride vehicle, in accordance with an aspect of the present disclosure.
Figure 6:
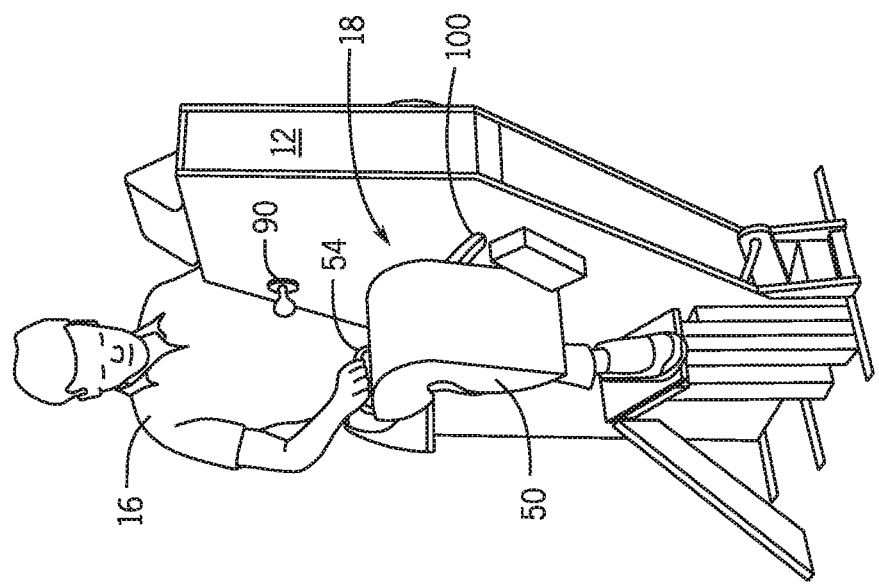
FIG. 6 is a right perspective view illustrating an embodiment of the restraint system of FIG. 1 in a partially closed position, in accordance with an aspect of the present disclosure.

FIG. 5 is a right perspective view illustrating an embodiment of the ride vehicle 12 with the park guest 16 now fully seated in the ride vehicle 12. More specifically, the park guest 16 is seated astride the ride vehicle 12 holding the upper handles 90 while the conformable component 50 and the behind-the-knee component 52 are still deployed in the fully open position. When the park guest 16 is ready to close the restraint system 18, the park guest 16 may hold one or both handles 54 and pull, as shown in FIG. 6. More specifically, FIG. 6 is a right perspective view illustrating an embodiment of the restraint system 18 in a partially closed position where the conformable component 50 has moved along a groove 100 closer to the knee area of the park guest 16.

Figure 7:
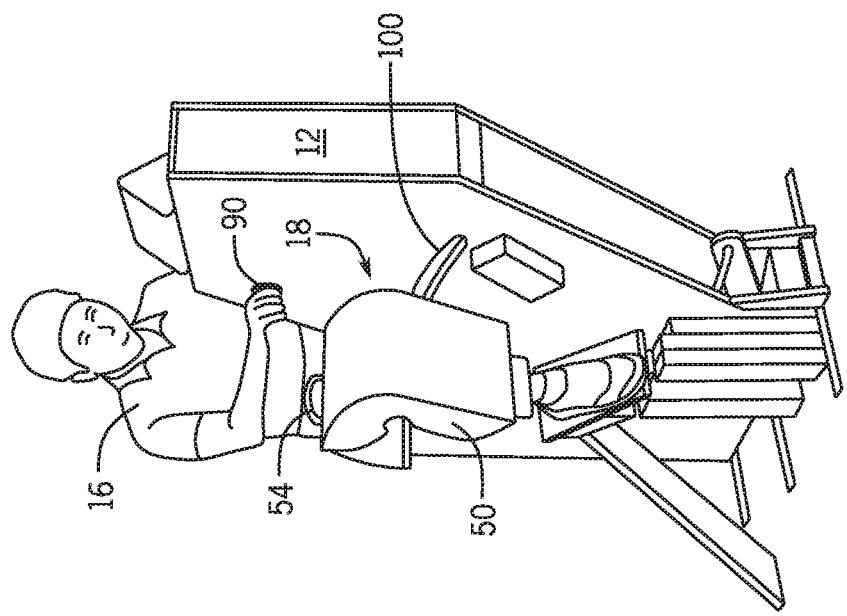
FIG. 7 is a right perspective view depicting an embodiment of the restraint system of FIG. 1 in a fully closed, locked position, in accordance with an aspect of the present disclosure.

FIG. 7 is a right perspective view depicting an embodiment of the restraint system 18 where the conformable component 50 and the behind-the-knee component 52 (not shown) are in a locked position. More specifically, the figure illustrates that the conformable component 50 is now fully disposed over the park guest's knee, thigh region, and shin region. As mentioned earlier, the control system 28 may sense pressure of the conformable component 50, the behind-the-knee component 52, or combination thereof, and lock the components 50, 52 in place when the pressure is at a certain measurement or range. The control system 28 may then dispatch the ride vehicle 12, with the park guest 16 now secured in place based on the pressure signal from the sensor(s) 26.

Figure 8:
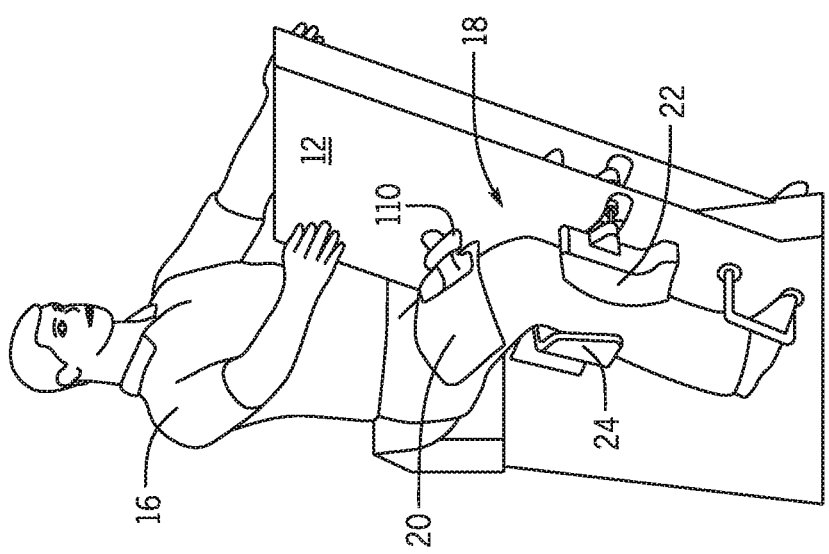
FIG. 8 a right perspective view of a guest astride the ride vehicle of FIG. 1 with the vehicle restraint system in a locked position prior to dismounting from the ride vehicle, in accordance with an aspect of the present disclosure.

It may be beneficial to illustrate a sequence where the park guest 16 and/or the control system 28 may unlock the restraint system 18 and then dismount the ride vehicle 12. Accordingly, FIGS. 8-11 depict various positions in sequential order where the restraint system 18 is unlocked prior to the guest 16 dismounting the ride vehicle 12. More specifically, FIG. 8 is a right perspective view of the guest 16 arriving at a load/unload station prior to dismounting from the ride vehicle 12. In the depicted embodiment, the restraint system 18 is shown as having three components per leg, more specifically, the components 20, 22, 24 shown previously with respect to FIG. 1. In the illustrated embodiment, the restraint system 18 is depicted in the locked position, for example, when arriving to the load/unload station after completion of the park ride. Accordingly, the conformable component 20 is shown as securing the park guest's thigh region, the conformable component 22 is shown as securing the park guest's shin region, and the behind-the-knee component 24 is shown as securing the leg behind the knee.

The conformable component 20 may include a shape (e.g., curved shape) suitable for enclosing the thigh portion. Likewise, the conformable component 22 may include a shape suitable for enclosing the shin area. In the depicted embodiment, the behind-the-knee component 24 is a "winged" component that includes a shape suitable for enclosing an upper calve portion of the leg. Also shown are a handle 110 that may be used to open and to close the restraint system 18.

Figure 9:
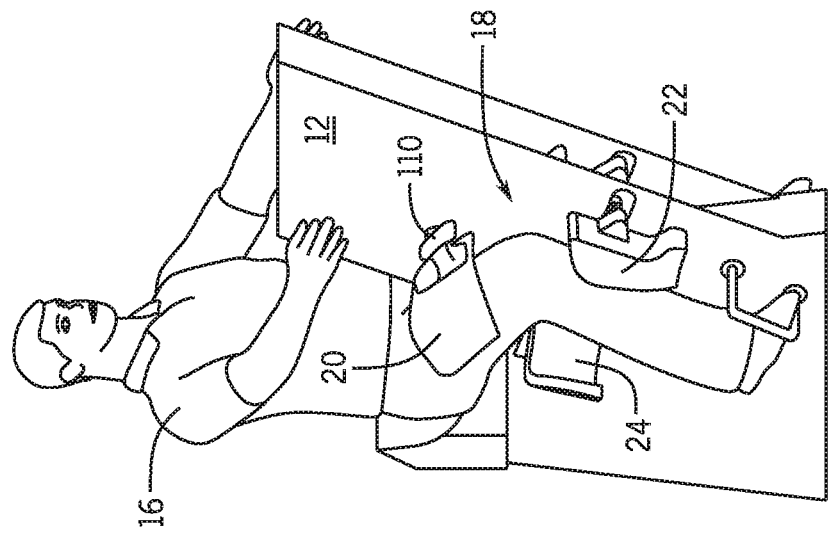
FIG. 9 is a right perspective view of a guest astride the ride vehicle of FIG. 1 with the vehicle restraint system in a partially open position, in accordance with an aspect of the present disclosure.

Once the ride is over, the restraint system 18 may be deployed to an open position, as shown in FIG. 9. In the illustration, the conformable components 20, 22 and the behind-the-knee component 24 are shown in a partially open position. As mentioned earlier, the park guest 16 may grasp the handle 110 to initiate the opening of the restraint system 18 or the control system 28 may automatically open the restraint system 18 based on the arrival and the subsequent stopping of the ride vehicle 12.

Figure 11:
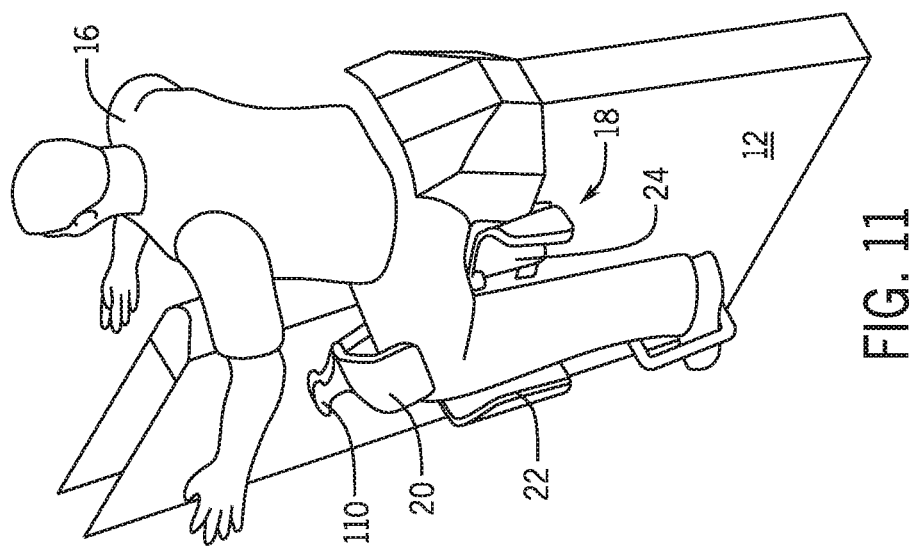
FIG. 11 is a rear left perspective view of a guest astride the ride vehicle of FIG. 1 with the vehicle restraint system in a fully open position, in accordance with an aspect of the present disclosure.
Figure 10:
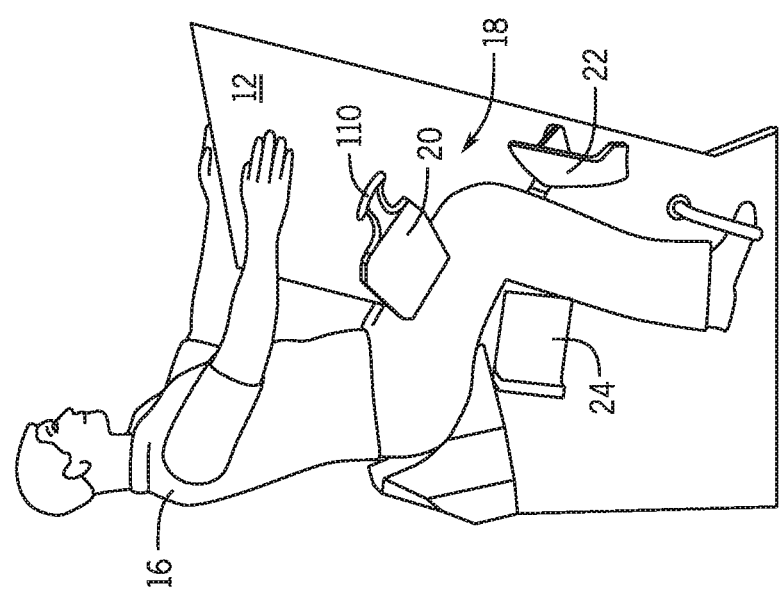
FIG. 10 is a left view of a guest astride the ride vehicle of FIG. 1 with the vehicle restraint system in a fully open position, in accordance with an aspect of the present disclosure.

FIG. 10 depicts a side view of an embodiment of the restraint system 18 with the conformable components 20, 22 and the behind-the-knee component 24 shown in a fully open position. Sensors 26 may also include proximity and/or position sensors such as limit switches, optoelectric switches, relay switches, Hall effect switches, and the like, that may provide the control system 28 an indication that the components 20, 22, and 24 are now in their respective open position. Accordingly, the control system 28 may derive that the components 20, 22, 24 are all in the open position during the unloading operations. As depicted, the conformable components 20, 22 and the behind-the-knee component 24 are in the fully deployed open position to enable the park guest 16 to exit the ride vehicle 12. FIG. 11 depicts a left rear perspective view of an embodiment of the components 20, 22, 24 also all shown in the fully open position. The park guest 16 may then dismount from the ride vehicle 12 either through the right side of the ride vehicle 12, or through the left side of the vehicle 12.

Figure 12:
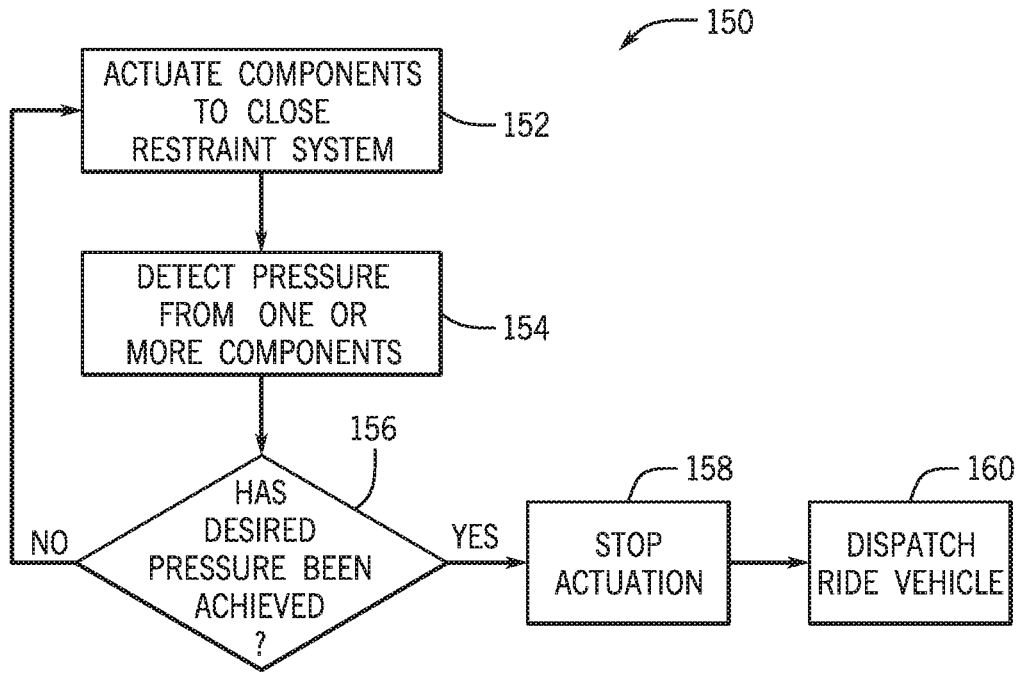
FIG. 12 is a flowchart of a process suitable for securing a guest in the ride vehicle of FIG. 1.

FIG. 12 is a flowchart of an embodiment of a process 150 that may be suitable for closing the restraint system 18. The process 150 may be implemented as computer code or instructions executable via the processor 32 and stored in the memory 34 of the control system 28. In the depicted embodiment, the process 150 may actuate (block 152) the conformable components (e.g., 20, 22, 50) and the behind-the-knee components (e.g., 24, 52) to close the restraint system 18. For example, the actuators 30 may be activated by the control system 28 to close the restraint system 18 components.

The process 150 may then detect (block 154) pressure exerted by the restraint system 18 component(s) (e.g., 20, 22, 24, 50, 52), such as pressure exerted when the component(s) are abutting against the park guest 16. For example, the control system 28 may receive sensor signals from the sensors 26 indicative of the exerted pressure(s). If a desired pressure or pressure range has been achieved (decision 156), the process 150 may then stop (block 158) actuation of the restraint system 18 components. It is to be understood that the sensors 26 may include redundant pressure sensors as well as other sensor types, such as proximity sensors. The process 150 may then dispatch (block 160), the ride vehicle 12 so that the park guest 16 may experience the park ride.

Figure 13:
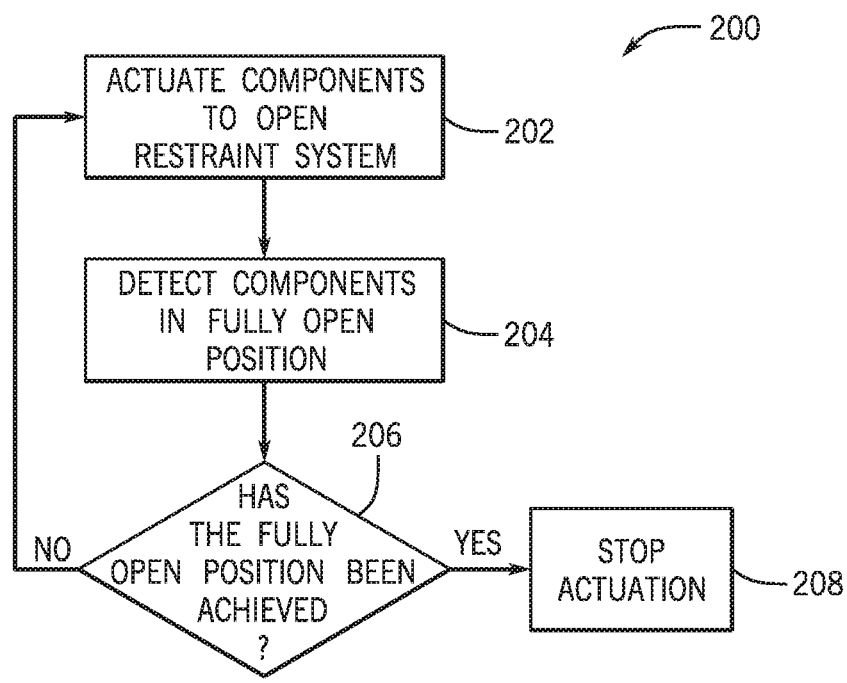
FIG. 13 is a flowchart of a process suitable for unlocking a restraint system for the ride vehicle of FIG. 1.

FIG. 13 is a flowchart of an embodiment of a process 200 that may be suitable for opening the restraint system 18. The process 200 may be implemented as computer code or instructions executable via the processor 32 and stored in the memory 34 of the control system 28. In the depicted embodiment, the process 200 may actuate (block 202) the conformable components (e.g., 20, 22, 50) and the behind-the-knee components (e.g., 24, 52) to open the restraint system 18. For example, the actuators 30 may be activated by the control system 28 to open the restraint system 18 components.

The process 200 may then detect (block 204) the position of the restraint system 18 components. For example, the control system 28 may receive sensor signals from the sensors 26 indicative of the position of each of the components 20, 22, 24, 50, 52. As mentioned earlier, some of the sensors 26 may be position sensors such as limit switches, optoelectric switches, relay switches, Hall effect switches, and the like, that may provide the control system 28 an indication of the position for one or more of the components 20, 22, 24, 50, 52.

If the fully open position for the components 20, 22, 24, 50, 52 has been achieved (decision 206), the process 200 may then stop (block 208) actuation of the restraint system 18 components. It is to be understood that the proximity sensors 26 may include redundant proximity sensors. By incorporating the techniques described herein, the park guests may be secured via ASTM class 3 or 4 restraints while allowing for freedom of movement of the upper body and arms.

As set forth above, the ride system of the present disclosure may provide one or more technical effects useful in enhancing the guest experience during the operation of a ride system in an amusement park. For example, embodiments of the ride system may include a restraint system suitable for securing guests that sit astride a ride vehicle, such as a ride vehicle representative of a horse. The restraint system may secure the lower portion of the guest's body, while leaving the arms and the upper body unencumbered. Conformable shapes may be included in the restraint system, suitable for conforming about body portions such as the knee, thigh region, and/or shin region of each leg. The restraint system may also include behind-the-knee components suitable for securing portions of each leg from behind. A control system may sense via one or more sensors when the restraint system is in place, as well as when the restraint system is fully open.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ride vehicle for an amusement park, comprising:
   a restraint system, comprising:
      a first conformable component configured to be disposed over a lower body portion of a guest;
      a behind-the-knee component configured to be disposed behind a leg of the guest, wherein the first conformable component and the behind-the-knee component are configured to stay in contact with the guest during operation of the restraint system;
   a sensor configured to transmit a signal representative of a pressure applied by the first conformable component to the lower body portion of the guest or by the behind-the-knee component to the guest, to a control system; and
      a linkage mechanism, wherein the control system is configured to control the linkage mechanism to move the first conformable component, the behind-the-knee component, or a combination thereof in response to the signal, to secure the restraint system to the guest.

2. The ride vehicle of claim 1, wherein the first conformable component comprises a thigh portion, a knee portion, a shin portion, or a combination thereof.

3. The ride vehicle of claim 1, wherein the restraint system comprises a second conformable component configured to be disposed over another lower body portion of the guest.

4. The ride vehicle of claim 1, wherein the control system is configured to control the linkage mechanism to move the first conformable component, the behind-the-knee component, or the combination thereof to a desired position, wherein the desired position is achieved when a desired pressure is reached between the first conformable component and the guest, between the behind-the-knee component and the guest, or a combination thereof.

5. The ride vehicle of claim 4, wherein the restraint system comprises an actuator configured to move the first conformable component, the behind-the-knee component, or the combination thereof, and wherein the control system is configured to actuate the actuator based on the signal.

6. The system of claim 1, wherein the restraint system comprises a handle configured to be manually actuated by the guest to open the restraint system, to close the restraint system, or a combination thereof.

7. The system of claim 6, wherein the handle is disposed on the first conformable component.

8. The system of claim 7, wherein the first conformable component is mechanically coupled to the behind-the-knee component via the linkage mechanism so that moving the first conformable component also moves the behind-the-knee component when the handle is actuated.

9. The system of claim 1, wherein the first conformable component comprises a shape suitable to be disposed over a knee area of the guest.

10. The system of claim 1, comprising a second conformable component configured to be disposed over another lower body portion of the guest and wherein the linkage mechanism is configured to move the first conformable component, the behind-the-knee component, the second conformable component, or a combination thereof, to secure the restraint system to the guest.

11. A method, comprising:
   receiving a first pressure signal and a second pressure signal from one or more sensors, wherein the one or more sensors are coupled to a first conformable component and a behind-the-knee component;
   actuating the first conformable component included in a restraint system of a ride vehicle for an amusement park, wherein the first conformable component is configured to be disposed over a lower body portion of a guest, and wherein the first conformable component is actuated to a first particular position based in part on the first pressure signal received from the one or more sensors; and
   actuating the behind-the-knee component included in the restraint system, wherein the behind-the-knee component is configured to be disposed behind a leg of the guest, wherein the behind-the-knee component is actuated to a second particular position based in part on the second pressure signal received from the one or more sensors.

12. The method of claim 11 wherein actuating the first conformable component, the behind-the-knee component, or a combination thereof, comprises controlling the restraint system via a control system, via a manual device, or a combination thereof.

13. The method of claim 12, wherein the manual device comprises a handle disposed on the first conformable component.

14. The method of claim 11, comprising actuating a second conformable component of the restraint, wherein the second conformable component is configured to be disposed over another lower body portion of the guest.

15. A restraint system of an amusement park ride, comprising:
   a first conformable component configured to be disposed over a lower body portion of a guest;
   a behind-the-knee component configured to be disposed behind a leg of the guest, wherein the first conformable component and the behind-the-knee component are configured to stay in contact with the guest during operation of the restraint system;

a sensor configured to transmit a signal representative of a pressure applied by the first conformable component to the guest or by the behind-the-knee component to the guest, or both, to a control system; and a linkage mechanism, wherein the control system is configured to control the linkage mechanism to move the first conformable component, the behind-the-knee component, or a combination thereof in response to the signal, to secure the restraint system to the guest.

16. The system of claim 15, wherein the control system is configured to control the linkage mechanism to move the first conformable component, the behind-the-knee component, or the combination thereof to a particular position, wherein the particular position is based on the applied pressure by the first conformable component or by the behind-the-knee component, or a combination thereof.

17. The system of claim 16, comprising an actuator configured to move the first conformable component, the behind-the-knee component, or the combination thereof, and wherein the control system is configured to actuate the actuator based on the signal.

18. The system of claim 15, comprising a handle configured to be manually actuated by the guest to open the restraint system, to close the restraint system, or a combination thereof.

19. The system of claim 15, comprising a second conformable component configured to be disposed over another lower body portion of the guest and wherein the linkage mechanism is configured to move the first conformable component, the behind-the-knee component, the second conformable component, or a combination thereof, to secure the restraint system to the guest.

* * * * *